United States Patent [19]

Abe et al.

[11] Patent Number: 5,786,943
[45] Date of Patent: Jul. 28, 1998

[54] ZOOM LENS SYSTEM HAVING A HIGH ZOOM RATIO

[75] Inventors: Tetsuya Abe, Hokkaido; Takayuki Ito; Takashi Enomoto, both of Tokyo, all of Japan

[73] Assignee: Asahi Kogaku Kogyo Kabushiki Kaisha, Tokyo, Japan

[21] Appl. No.: 702,045

[22] Filed: Aug. 23, 1996

[30] Foreign Application Priority Data

Aug. 25, 1995 [JP] Japan ................................. 7-217731

[51] Int. Cl.$^6$ ................................................. G02B 15/14
[52] U.S. Cl. ................................................. 359/688; 359/683
[58] Field of Search ................................. 359/688, 676, 359/684, 775, 683

[56] References Cited

U.S. PATENT DOCUMENTS

| | | | |
|---|---|---|---|
| 4,200,358 | 4/1980 | Tsuji et al. | 359/688 |
| 4,490,017 | 12/1984 | Okudaira et al. | 359/688 |
| 4,491,395 | 1/1985 | Okidaira et al. | 359/688 |
| 5,095,387 | 3/1992 | Horiuchi | 359/676 |
| 5,221,995 | 6/1993 | Yaneyama | 359/688 |
| 5,223,979 | 6/1993 | Yoneyama | 359/676 |
| 5,282,089 | 1/1994 | Abe | 359/688 |
| 5,371,630 | 12/1994 | Ito et al. | 359/688 |
| 5,477,389 | 12/1995 | Ito et al. | 359/752 |
| 5,513,045 | 4/1996 | Ito et al. | 359/750 |
| 5,557,472 | 9/1996 | Ito et al. | 359/751 |
| 5,579,172 | 11/1996 | Aoki et al. | 359/688 |

FOREIGN PATENT DOCUMENTS

| | | |
|---|---|---|
| 7-63986 | 3/1995 | Japan. |
| 7-63989 | 3/1995 | Japan. |

*Primary Examiner*—Georgia Y. Epps
*Assistant Examiner*—Jordan M. Schwartz
*Attorney, Agent, or Firm*—Greenblum & Bernstein P.L.C.

[57] ABSTRACT

First, second, third, and fourth lens groups, from an object side, have positive, negative, negative, and positive power, respectively. Movable second and third lens groups vary magnification and perform focus compensating. The fixed fourth lens group has an image forming function, and includes, from the object side, positive first and second lens sub-groups. The zoom lens satisfies the following relationships:

$$5.5 < L_{W2-3}/f_w < 8.5,$$

$$0.2 < |m_{2W}| < 0.4 \, (m_{2W} < 0),$$

$$0.6 < |m_4| < 0.9 \, (m_4 < 0), \text{ and}$$

$$0.5 < m_{4b} < 0.9.$$

$L_{W2-3}$ represents a distance between the second and third lens groups, $f_w$ represents a focal length of the entire lens system, and $m_{2W}$ represents a lateral magnification of the second lens group, each at a shortest focal length. Further, $m_4$ and $m_{4b}$ represent lateral magnifications of the fourth lens group and the second lens subgroup of the fourth lens group, respectively.

4 Claims, 7 Drawing Sheets

Spherical Aberration

Sine Condition

Spherical Aberration

Chromatic Aberration

Astigmatism

Distortion

Spherical Aberration  Sine Condition

Spherical Aberration  Chromatic Aberration

Astigmatism

Distortion

Spherical
Aberration

Sine Condition

Spherical
Aberration

Chromatic
Aberration

Astigmatism

Distortion

Spherical Aberration

Sine Condition

Spherical Aberration

Chromatic Aberration

Astigmatism

Distortion

Spherical Aberration

Sine Condition

Spherical Aberration

Chromatic Aberration

Astigmatism

Distortion

Spherical Aberration

Sine Condition

Spherical Aberration

Chromatic Aberration

Astigmatism

Distortion

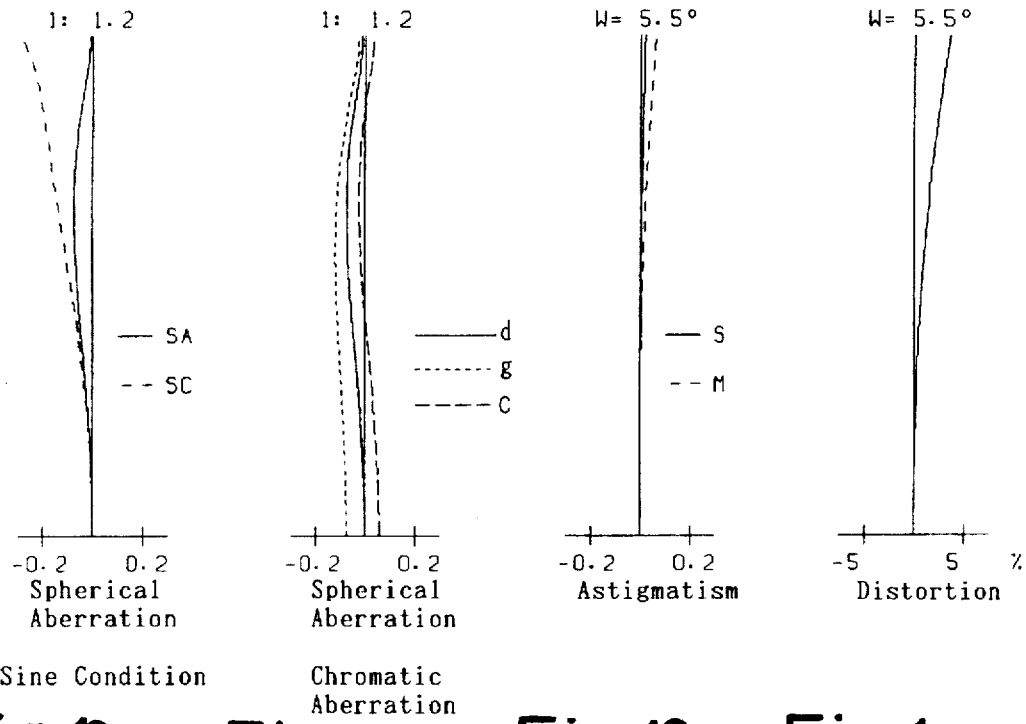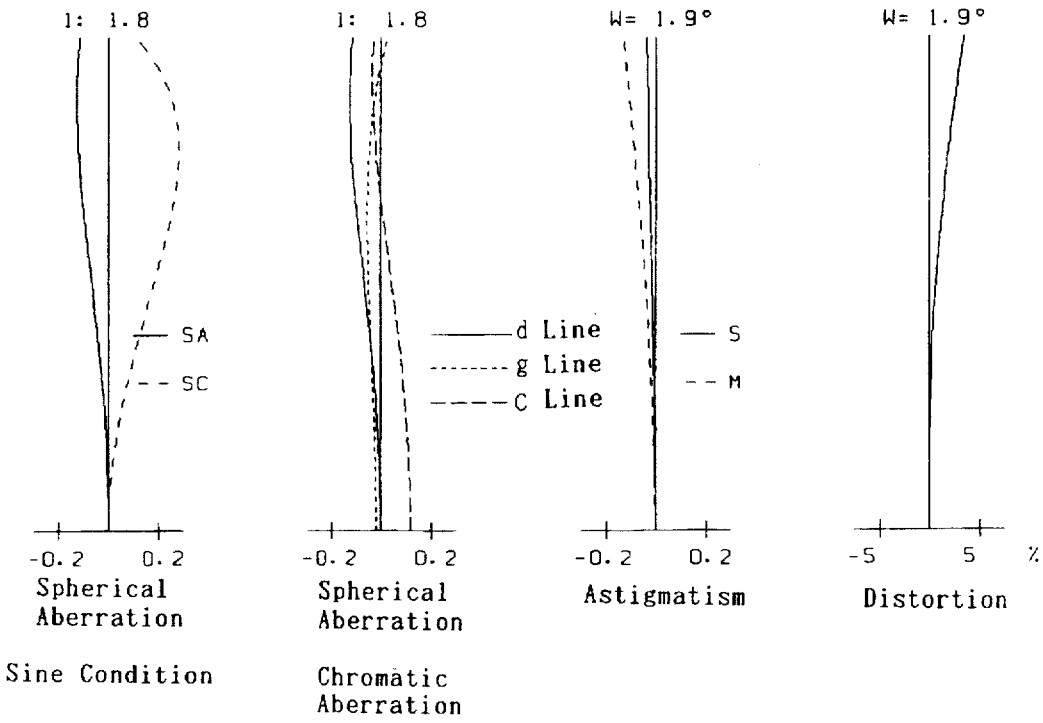

ZOOM LENS SYSTEM HAVING A HIGH ZOOM RATIO

BACKGROUND OF THE INVENTION

1. Field of the Invention

The present invention relates to a compact zoom lens system having a high zoom ratio approximately equal to 15, and which is applicable for use in a small TV camera, such as a closed-circuit television CCTV camera.

2. Description of the Related Art

In a small TV camera, such as a CCTV camera, it is preferrable for a zoom lens to have a large aperture and a high zoom ratio. However, in conventional CCTV cameras, when the aperture is large, having an F-number approximately as low as 1.2, the zoom ratio is less than 10. Conversely, when the zoom ratio is higher than 10, the aperture is small having F-number is approximately equal to 2.

SUMMARY OF THE INVENTION

It is an object of the present invention to provide a compact and highly efficient zoom lens system in which the F-number at the shortest focal length extremity, and the zoom ratio can be increased to be, approximately 1.2 and 15, respectively, in response to a miniaturization of an image pickup device.

To achieve the object mentioned above, according to the present invention, there is provided a zoom lens system having a first lens group having a positive power, a second lens group having a negative power, a third lens group having a negative power, and a fourth lens group having a positive power, arranged in this order from an object side. The second lens group has a magnification varying function and is moved during a zooming operation. The third lens group has a focus compensating function and is moved during the zooming operation. The fourth lens group has an image forming function and is not moved during the zooming operation. The fourth lens group consists of first and second sub-lens groups each having a positive power, in this order from the object side. The first and second sub-lens groups are spaced having a maximum distance therebetween. The zoom lens system satisfies the following relationships (1) through (4):

$$5.5 < L_{w2-3}/f_W < 8.5 \quad (1)$$

$$0.2 < |m_{2W}| < 0.4 \ (m_{2W} < 0) \quad (2)$$

$$0.6 < |m_4| < 0.9 \ (m_4 < 0) \quad (3)$$

$$0.5 < m_{4b} < 0.9 \quad (4)$$

wherein $L_{w2-3}$ represents the distance between the second lens group and the third lens group at a shortest focal length extremity, $f_W$ represents the focal length of the whole lens system at the shortest focal length extremity, $m_{2W}$ represents the lateral magnification of the second lens group at the shortest focal length extremity, $m_4$ represents the lateral magnification of the fourth lens group, and $m_{4b}$ represents the lateral magnification of the second sub-lens group of the fourth lens group.

The focusing operation is effected by the movement of the first lens group in an optical axis direction.

Preferably, the first sub-lens group of the fourth lens group consists of a positive first lens element, a positive second lens element, a negative third lens element and a positive fourth lens element, in this order from the object side, and satisfies the following relationships (5), (6) and (7):

$$0.8 < f_4/f_{4a} < 1.3 \quad (5)$$

$$-0.7 < f_{4a}/f_{4a-3} < -0.4 \quad (6)$$

$$0.2 < f_{4a}/f_{4a-4} < 0.7 \quad (7)$$

wherein $f_4$ represents the focal length of the fourth lens group, $f_{4a}$ represents the focal length of the first sub-lens group of the fourth lens group, $f_{4a-3}$ represents the focal length of the negative third lens element of the first sub-lens group of the fourth lens group, and $f_{4a-4}$ represents the focal length of the positive fourth lens element of the first sub-lens group of the fourth lens group that is located closest to an image to be formed.

Preferably, the second sub-lens group of the fourth lens group consists of a positive lens element, a negative lens element and a positive lens element, in this order from the object side, and satisfies the following relationships (8) through (11):

$$0.2 < f_{4d}/f_{4b} < 0.6 \quad (8)$$

$$0.7 < f_{4b}/f_{4b-1} < 1.2 \quad (9)$$

$$-3.0 < f_{4b}/f_{4b-2} < -2.0 \quad (10)$$

$$1.0 < L_{4ab}/f_W < 2.3 \quad (11)$$

wherein $f_{4b}$ represents the focal length of the second sub-lens group of the fourth lens group, $f_{4b-1}$ represents the focal length of the positive lens element of the second sub-lens group of the fourth lens group located nearest to the object side, $f_{4b-2}$ represents the focal length of the negative lens element of the second sub-lens group of the fourth lens group, and $L_{4ab}$ represents the distance between the first sub-lens group and the second sub-lens group of the fourth lens group.

Preferably, a diaphragm is provided between the third lens group and the fourth lens group so as not to move during the zooming operation.

BRIEF DESCRIPTION OF THE DRAWINGS

The present invention will be described below in detail with reference to the accompanying drawings, in which similar elements are indicated by similar reference numerals, and wherein:

FIGS. 11A, 11B, 11C and 11D show aberration diagrams of the zoom lens system shown in FIG. 9, at an intermediate focal length;

FIGS. 12A, 12B, 12C and 12D show aberration diagrams of the zoom lens system shown in FIG. 9, at a longest focal length extremity; and, FIG. 13 shows a zoom track diagram of a zoom lens system having a high zoom ratio according to the embodiments.

DESCRIPTION OF THE PREFERRED EMBODIMENTS

A zoom lens system according to the present invention consists of four lens groups, in which a fourth lens group 14 does not move during a zooming operation. The magnification varying operation is mainly carried out by the movement of a negative second lens group 12.

Figure 13:
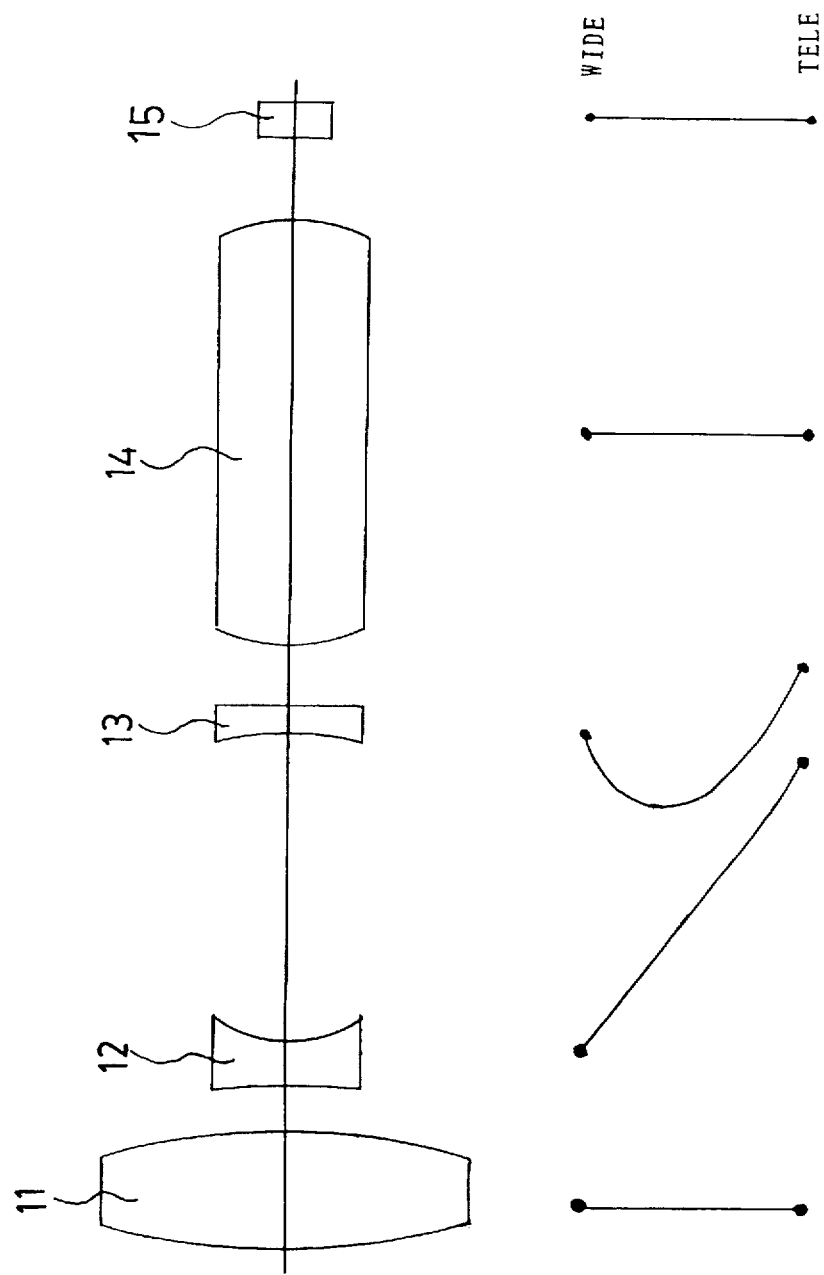

FIG. 13 shows zooming tracks of each of the lens groups (first group 11, second group 12, third group 13, and fourth group 14) of the zoom lens system. Generally, to increase the zoom ratio in the zoom lens system as constructed above, it is necessary to increase the distance between the second lens group 12 and the third lens group 13 at the shortest focal length extremity, as specified in relationship (1):

$$5.5 < L_{W2-3}/f_W < 8.5.$$

If the ratio defined in relationship (1) is below the lower limit (5.5), it is difficult to obtain a high zoom ratio. If an attempt is made to increase the zoom ratio when the ratio defined in relationship (1) is below the lower limit, a considerable fluctuation of aberrations, produced during the zooming operation, occurs. Conversely, if the ratio defined in relationship (1) is above the upper limit (8.5), no miniaturization of the zoom lens system can be achieved.

Moreover, since the magnification is varied mainly by the movement of the second lens group 12 as mentioned above, the lateral magnification of the second lens group 12 at the shortest focal length extremity is set to be small, as specified in relationship (2):

$$0.2 < |m_{2W}| < 0.4 \ (m_{2W} < 0)$$

in comparison with a conventional zoom lens having a relatively small zoom ratio.

If the lateral magnification of the second lens group 12 specified in relationship (2) is smaller than the lower limit, it is impossible to obtain a high zoom ratio without increasing the displacement of the second lens group 12. The increase in the displacement of the second lens group 12 leads to an increase in the size of the zoom lens system. Conversely, if the lateral magnification of the second lens group 12 is above the upper limit specified in relationship (2), the lateral magnification ($m_{2T}$) is too large to correct the fluctuation of the aberrations caused during the zooming operation, since the lateral magnification ($m_{2T}$) at the longest focal length extremity is substantially identical to a product of the lateral magnification ($m_{2W}$) at the shortest focal length extremity and the zoom ratio (i.e., $m_{2T} \approx \alpha \cdot m_{2W}$, wherein $\alpha$ represents the zoom ratio).

Relationship (3):

$$0.6 < |m_4| < 0.9 \ (m_4 < 0),$$

specifies the lateral magnification of the fourth lens group 14 having an image forming function. To increase the aperture so that the F-number can be approximately equal to 1.2, the lateral magnification of the fourth lens group ($|m_4|$) is selected to be slightly smaller than 1, as specified in relationship (3). If the lateral magnification of the fourth lens group, ($|m_4|$) is larger than the upper limit specified in relationship (3), it is difficult to correct the aberrations caused in the variable power lens groups (first through third lens groups 11-13) by the fourth lens group 14. Thus, it is difficult to obtain a zoom lens system whose aperture is large and the F-number is approximately 1.2. If the lateral magnification of the fourth lens group ($|m_4|$) is smaller than the lower limit specified in relationship (3), the negative power of the variable power lens groups is reduced, that is, the focal length of the variable power lens groups is increased, and hence it is necessary to increase the whole length of the variable power lens groups to obtain a desired focal length range.

The fourth lens group 14 consists of a first sub-lens group 14a and a second sub-lens group 14b in this order from an object side.

Relationship (4):

$$0.5 < m_{4b} < 0.9,$$

specifies the lateral magnification of the second sub-lens group 14b of the fourth lens group 14b, to reduce the whole length of the fourth lens group 14 and to balance the correction of the aberrations by the fourth lens group 14. If the lateral magnification of the second sub-lens group 14b is above the upper limit specified in relationship (4), the lens system can be miniaturized, but the power of the first sub-lens group 14a is increased, and hence, it is difficult to effectively correct the aberrations (particularly, spherical aberrations) of a zoom lens having a small F-number approximately equal to 1.2. If the lateral magnification of the second sub-lens group 14b of the fourth lens group 14 is below the lower limit specified in relationship (4), the aberrations can be effectively corrected but the whole length of the fourth lens group 14 is increased contrary to the desire for miniaturization.

The first sub-lens group 14a preferably consists of a positive first lens element, a positive second lens element, a negative third lens element, and a positive fourth lens element, in this order from the object side. The second sub-lens group 14b preferably consists of a positive first lens element, a negative second lens element, and a positive third lens element, in this order from the object side. As mentioned above, if the negative lens element respectively provided in the first sub-lens group 14a and the second sub-lens group 14b is provided having positive lens elements at a front (i.e., the left hand side in FIGS. 1, 5 and 9) side and a rear (i.e., the right hand side in FIGS. 1, 5 and 9) thereof, aberrations, particularly spherical aberrations, in a zoom lens system whose F-number is approximately equal to 1.2 can be effectively corrected while keeping a high zoom ratio.

Relationships (5), (6) and (7) specify the requirements of the lens elements of the first sub-lens group 14a consisting of a positive first lens element, a positive second lens element, a negative third lens element and a positive fourth lens element. Relationship (5):

$$0.8<f_4/f_{4a}<1.3$$

defines the power of the first sub-lens group 14a belonging to the fourth lens group. If the value of the ratio defined in relationship (5) is larger than the upper limit, the lens system can be made compact but it is difficult to correct the spherical aberrations and to obtain a large aperture. If the value is smaller than the lower limit specified in relationship (5), the whole length of the fourth lens group is increased.

Relationship (6):

$$-0.7<f_{4a}/f_{4a-3}<-0.4,$$

defines the power of the negative lens element of the first sub-lens group 14a. If the value of the ratio defined in relationship (6) is larger than the upper limit, the negative power is too small to correct the aberrations within the first sub-lens group having a large positive power. If the value is smaller than the lower limit specified in relationship (6), the negative power is so large that a high-order spherical aberration is produced.

Relationship (7):

$$0.2<f_{4a}/f_{4a-4}<0.7,$$

specifies the power of the lens element of the first sub-lens group 14a that is located closest to an image to be formed to correct the aberrations produced by the negative lens element of the first sub-lens group. If the value of the ratio specified in relationship (7) is above the upper limit, the lens system can be appropriately miniaturized, but the power of the lens element of the first sub-lens group 14a that is located on the image side and the power of the negative lens element thereof, tend to become so large that high-order spherical aberrations are produced. If the value of the ratio specified in relationship (7) is below the lower limit, no correction of aberrations can be effected within the first sub-lens group.

Relationships (8), (9) and (10) specify the requirements of the second sub-lens group 14b consisting of a positive first lens element, a negative second lens element and a positive third lens element. Relationship (8):

$$0.2<f_{4a}/f_{4b}<0.6,$$

defines a ratio between the powers of the first sub-lens group 14b and the second sub-lens group 14b. Preferably, the power of the second sub-lens group 14b is smaller than the power of the first sub-lens group 14a to miniaturize the lens system and effectively correct the aberrations. The image forming function of the fourth lens group mainly relies upon the first sub-lens group 14a, and the second sub-lens group 14b is adapted to supplement the image forming function of the first sub-lens group 14a and balance the off-axis astigmatism, a curvature of field and a distortion. If the value of the ratio defined in relationship (8) is larger than the upper limit, the power of the second sub-lens group 14b increases and the power of the first sub-lens group 14a decreases so that the whole length of the fourth lens group 14 is increased. If the value of the ratio defined in relationship (8) is smaller than the lower limit, the power of the second sub-lens group 14b becomes so small that a burden of the image forming function on the first sub-lens group is increased, thus resulting in unbalanced aberrations in the fourth lens group 14.

Relationships (9) and (10) define the power distribution in the second sub-lens group 14b. If the value of the ratio specified in relationship (9):

$$0.7<f_{4b}/f_{4b-1}<1.2,$$

is above the upper; limit, that is, the power of the positive lens element on the object side is large, the negative power of the second lens element becomes so large that high-order aberrations are produced. Conversely, if the value of the ratio defined in relationship (9) is smaller than the lower limit, that is, the power of the positive lens element on the object side is small, there is little effect which can be expected by the presence of the positive lens element on the object side of the second sub-lens group 14b, so that the burden on the positive lens element of the first sub-lens group 14a is increased.

If the value of the ratio specified in relationship (10):

$$-3.0<f_{4b}/f_{4b-2}<-2.0,$$

is smaller than the lower limit, the power of the negative lens element of the second sub-lens group 14b is so large that an over-correction of the astigmatism and distortion occurs. Consequently, it is difficult to effectively correct the astigmatism in the focal length range from the shortest focal length extremity to an intermediate focal length and the distortion on the long focal length side, thus resulting in unbalanced aberrations. If the value of the ratio specified in relationship (10) is larger than the upper limit, no aberration produced by the first sub-lens group 14a and the first lens element of the second sub-lens group 14b can be corrected.

Relationship (11):

$$1.0<L_{4ab}/f_W<2.3,$$

specifies the distance between the first sub-lens group 14a and the second sub-lens group 14b. If the distance between the first sub-lens group 14a and the second sub-lens group 14b meets this requirement, the aberrations can be well balanced and the entirety of the fourth lens group 14 can be made compact. If the value of the ratio defined by relationship (11) is larger than the upper limit, the whole length of the fourth lens group 14 is increased, contrary to the desire to make the lens system compact. If the value of the ratio specified in relationship (11) is smaller than the lower limit, it is difficult to correct the astigmatism, curvature of field and distortion.

A diaphragm (aperture stop) 5 is provided between the variable power lens groups (1st–3rd lens groups 11–13) and the fourth lens group 14 so as not to move during the zooming operation. This arrangement simplifies the mechanical structure of a lens barrel and reduces the diameter of the first lens group 11 at a high zoom ratio.

In general, a CCTV camera is provided with a neutral density ND filter in the vicinity of the aperture to expand the range of adjustment of the quantity of light. To prevent an occurrence of ghost images of the image pickup surface and the ND filter, it is preferable that the diaphragm be provided between the variable power lens groups 11–13 having a large negative power and the fourth lens group 14 having a large positive power.

Several examples (embodiments) of the present invention will be discussed below.

Figure 1:
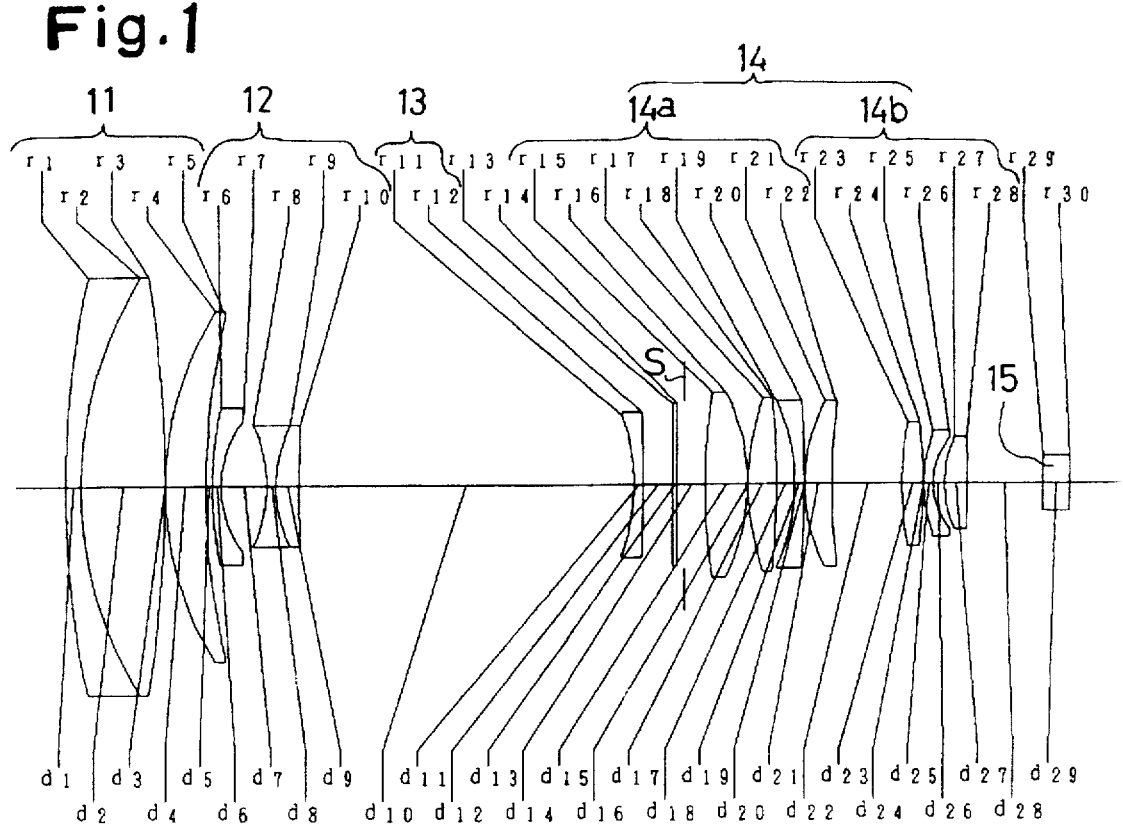
FIG. 1 is a schematic view of a lens configeration of a zoom lens system having a high zoom ratio, according to a first embodiment of the present invention.
Figure 2A:
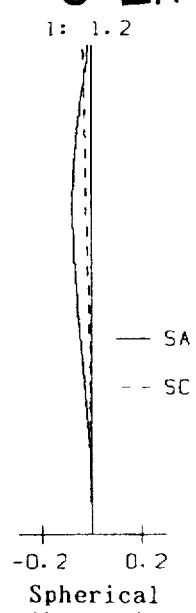
FIGS. 2A, 2B, 2C and 2D show aberration diagrams of the zoom lens system shown in FIG. 1, at a shortest focal length extremity.
Figure 2B:
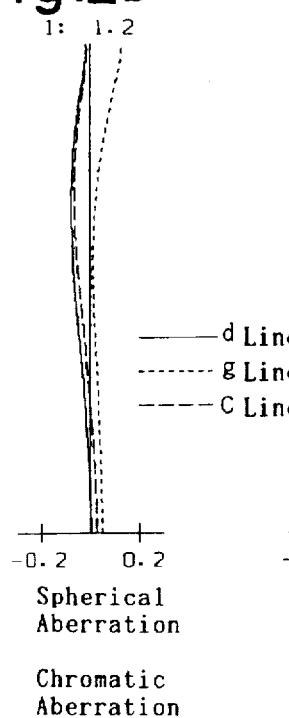
Figure 2C:
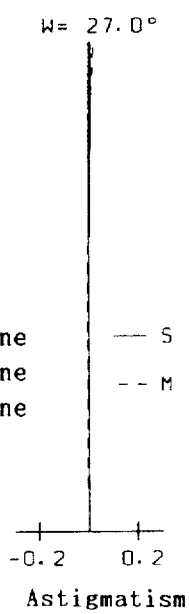
Figure 2D:
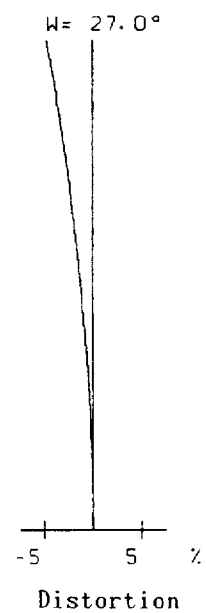
Figure 3A:
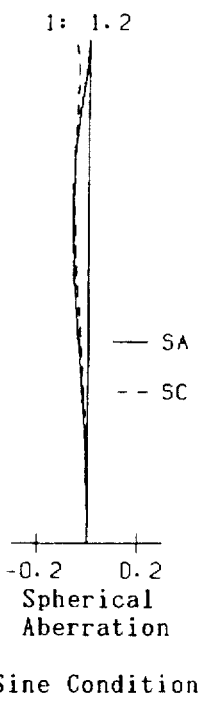
FIGS. 3A, 3B, 3C and 3D show aberration diagrams of the zoom lens system shown in FIG. 1, at an intermediate focal length.
Figure 3B:
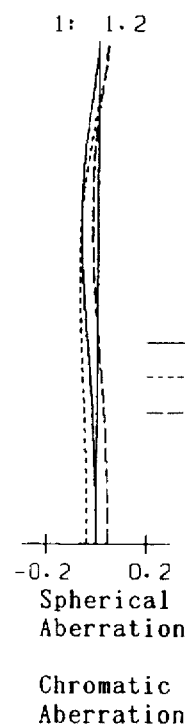
Figure 3C:
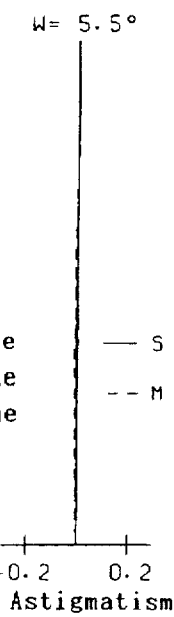
Figure 3D:
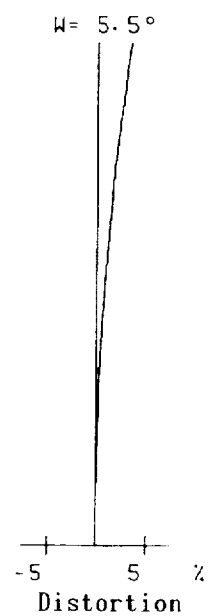
Figure 4A:
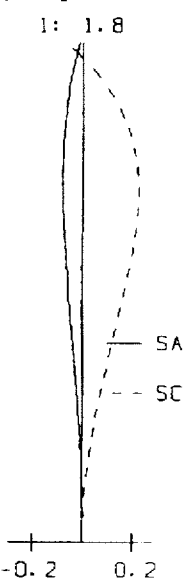
FIGS. 4A, 4B, 4C and 4D show aberration diagrams of the zoom lens system shown in FIG. 1, at a longest focal length extremity.
Figure 4B:
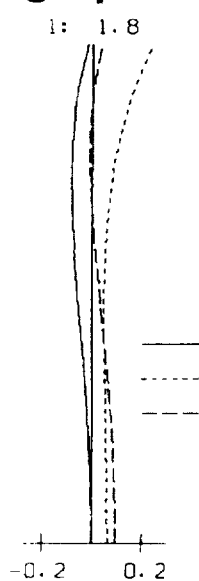
Figure 4C:
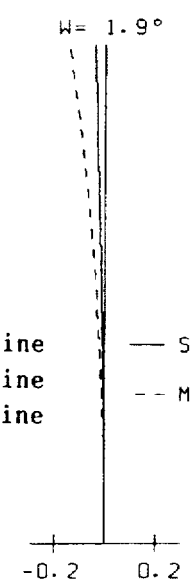
Figure 4D:
Figure 5:
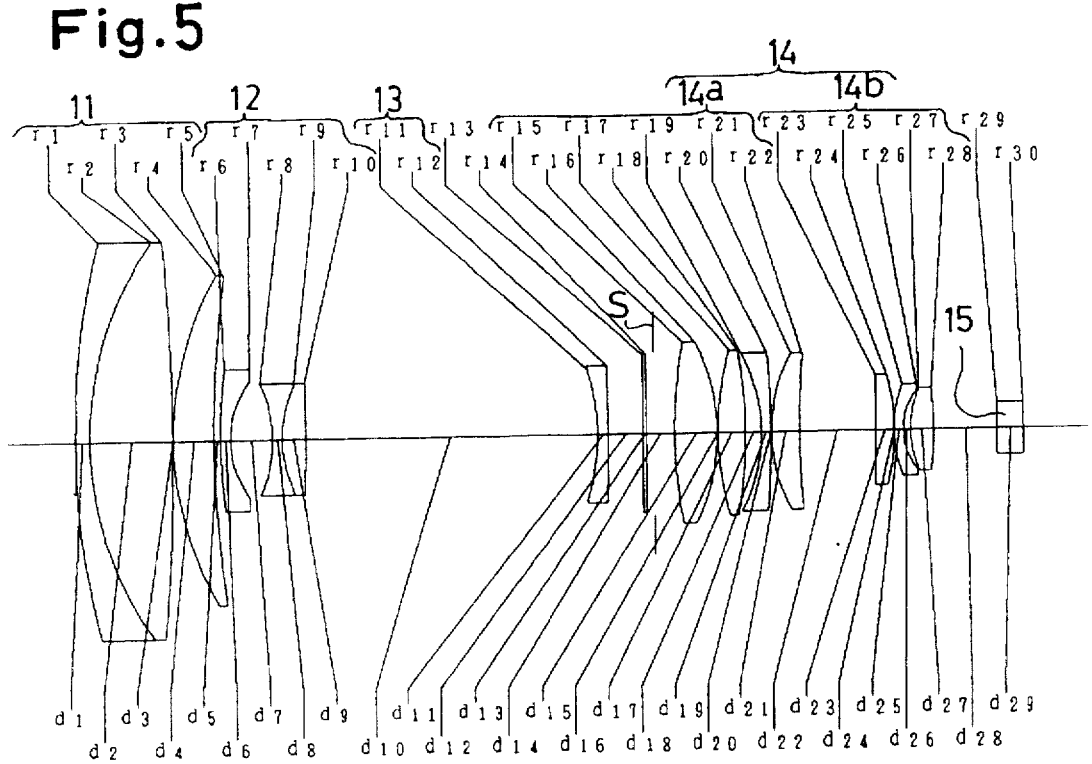
FIG. 5 is a schematic view of a lens configeration of a zoom lens system having a high zoom ratio, according to a second embodiment of the present invention.
Figure 6A:
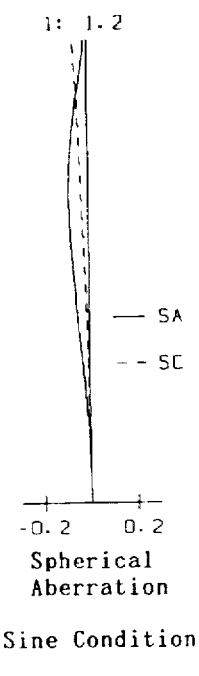
FIGS. 6A, 6B, 6C and 6D show aberration diagrams of the zoom lens system shown in FIG. 5, at a shortest focal length extremity.
Figure 6B:
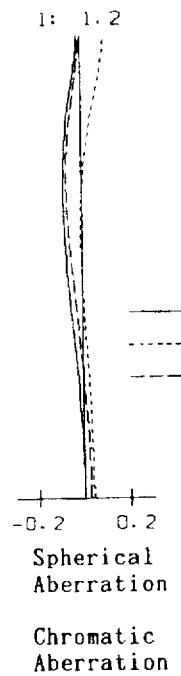
Figure 6C:
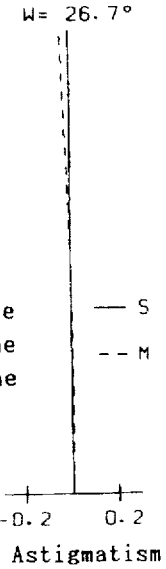
Figure 6D:
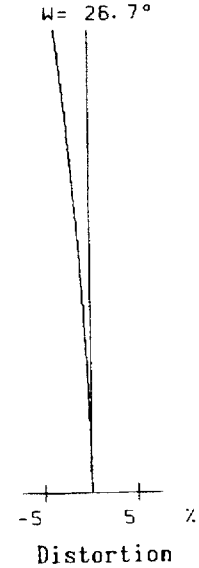
Figure 7A:
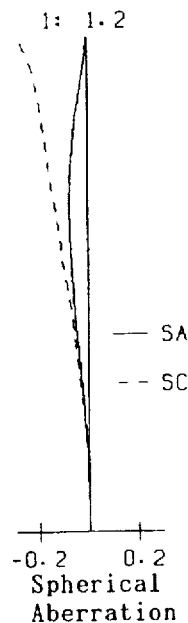
FIGS. 7A, 7B, 7C and 7D show aberration diagrams of the zoom lens system shown in FIG. 5, at an intermediate focal length.
Figure 7B:
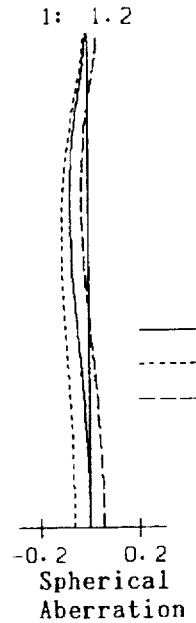
Figure 7C:
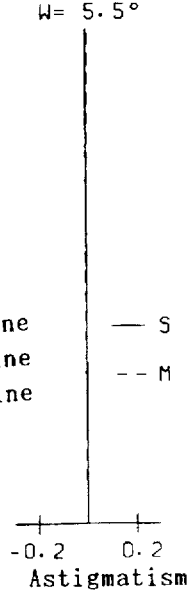
Figure 7D:
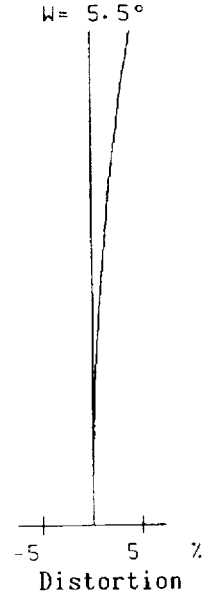
Figure 8A:
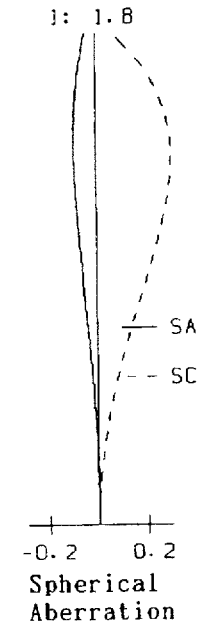
FIGS. 8A, 8B, 8C and 8D show aberration diagrams of the zoom lens system shown in FIG. 5, at a longest focal length extremity.
Figure 8B:
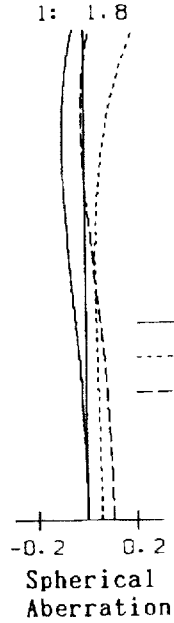
Figure 8C:
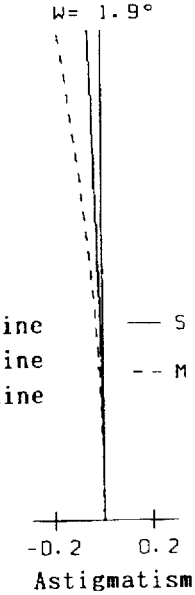
Figure 8D:
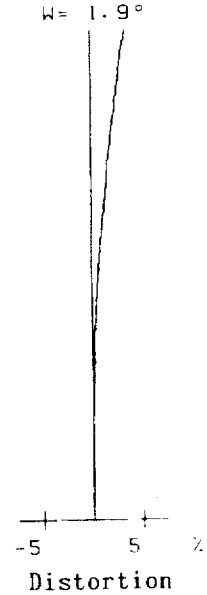
Figure 9:
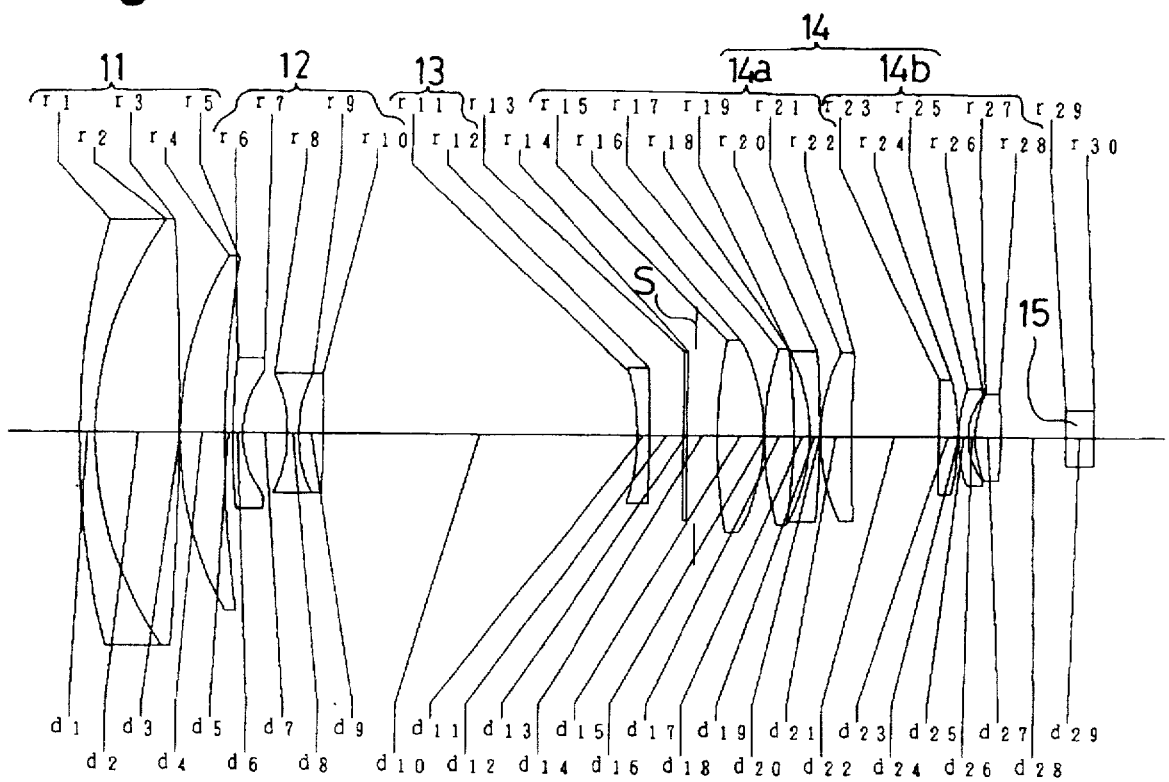
FIG. 9 is a schematic view of a lens configeration of a zoom lens system having a high zoom ratio, according to a third embodiment of the present invention.
Figures 10A, 10B, 10C, 10D:
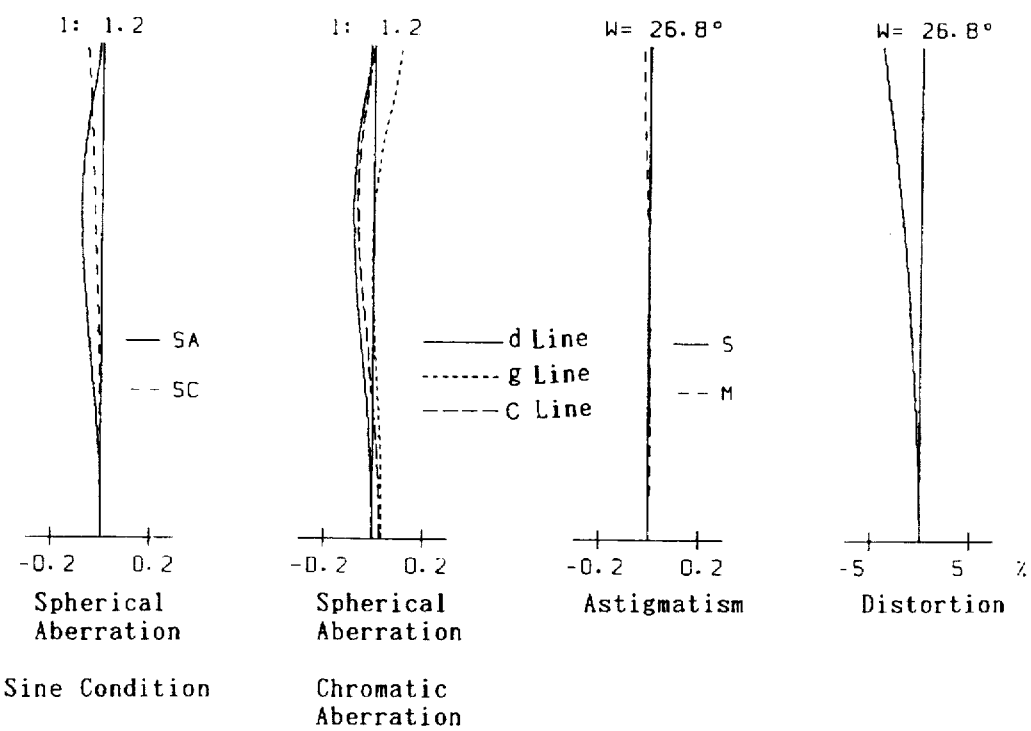
FIGS. 10A, 10B, 10C and 10D show aberration diagrams of the zoom lens system shown in FIG. 9, at a shortest focal length extremity.

FIGS. 1, 5 and 9 respectively show lens configurations of the first, second and third embodiments of the present invention.

In the first, second and third embodiments, the lens system consists of a first lens group 11, a second lens group 12, a third lens group 13 and a fourth lens group 14. The first lens group 11 consists of three lens elements, two of which are cemented together (surface Nos. 1 to 5). The second lens group 12 consists of three lens elements, two of which are cemented together (surface Nos. 6 to 10). The third lens group 13 consists of a single lens element (surface Nos. 11 and 12).

In FIGS. 1, 5 and 9, surface Nos. 13 and 14 positioned at the rear (i.e., to the right in FIGS. 1, 5 and 9) of the third lens group 13 define an ND filter which is provided in front of a diaphragm S. The ND filter controls the quantity of light. The ND filter has no influence on the aberration.

The fourth lens group 14 consists of a first sub-lens group 14$a$ having surface Nos. 15 to 22 and a second sub-lens group 14$b$ having surface Nos. 23 to 28.

The surface Nos. 29 and 30 define a glass cover 15 provided in front of the CCD. Note that in practice, the glass cover 15 is integrally provided with a filter, but is referred to as a single glass cover. The maximum distance between the adjacent lens elements within the fourth lens group 14 is indicated by $d_{22}$.

The first, second and third embodiments will be described with reference to the following tables and the accompanying drawings, in which "$F_{NO}$" represents the F-number, "f" represents the focal length, "ω" represents the half angle of view, "$f_B$" represents the back focal distance (distance between the last lens and the image pickup surface of the CCD including the glass cover 15; the image pickup surface is identical to the second surface of the glass cover 15 in the illustrated embodiment), "ri" represents the radius of curvature of each lens surface, "di" represents the lens thickness or distance between adjacent lenses, "N" represents the refractive index of the d-line, and "υ" represents the Abbe number of the d-line. In the aberration drawings (FIGS. 2A through 2D, 3A through 3D, 4A through 4D, 6A through 6D, 7A through 7D, 8A through 8D, 10A through 10D, 11A through 11D and 12A through 12D) "SA" represents the spherical aberration, "SC" represents the sine condition, "d-line", "g-line" and "C-line" represent the chromatic aberrations represented by spherical aberrations, at the respective wavelengths, "S" the sagittal rays, and "M" the meridional rays, respectively.

<Embodiment 1>

A lens configuration of the zoom lens system having a high zoom ratio according to the first embodiment is shown in FIG. 1. Numerical data regarding the first embodiment is shown in Table 1 below, with the multiple values (separated by dashes) for "$F_{NO}$", "f", "ω", and "di" values corresponding to shortest, intermediate, and longest focal lengths in that order. Aberrations at a shortest focal length extremity, an intermediate focal length, and a longest focal length extremity are shown in FIGS. 2A through 2D, 3A through 3D and 4A through 4D, respectively.

TABLE 1

$F_{NO} = 1:1.2–1.2–1.8$
$f = 6.18–30.00–87.50$
$ω = 27.0–5.5–1.9$
$f_B = d_{28} + d_{30} = 13.18$

| surface No. | r | d | N | υ |
|---|---|---|---|---|
| 1 | 128.547 | 2.00 | 1.80518 | 25.4 |
| 2 | 52.445 | 10.70 | 1.62041 | 60.3 |
| 3 | −176.300 | 0.10 | — | — |
| 4 | 43.580 | 5.20 | 1.69680 | 55.5 |
| 5 | 95.900 | 0.83–32.01–41.36 | — | — |
| 6 | 48.884 | 1.20 | 1.80400 | 46.6 |
| 7 | 14.266 | 5.88 | — | — |
| 8 | −18.093 | 1.20 | 1.69680 | 55.5 |
| 9 | 18.093 | 3.00 | 1.84666 | 23.8 |
| 10 | 330.000 | 43.27–5.94–5.68 | — | — |
| 11 | −25.970 | 1.20 | 1.69680 | 55.5 |
| 12 | −166.077 | 3.72–9.86–0.78 | — | — |
| 13 | ∞ | 0.50 | 1.51633 | 64.1 (ND filter) |
| 14 | ∞ | 1.00 | — | — |
| diaphragm | ∞ | 2.80 | — | — |
| 15 | 83.620 | 5.40 | 1.72916 | 54.7 |
| 16 | −27.090 | 0.10 | — | — |
| 17 | 33.696 | 3.70 | 1.62041 | 60.3 |
| 18 | −115.546 | 2.42 | — | — |
| 19 | −24.900 | 1.20 | 1.84666 | 23.8 |
| 20 | −196.875 | 0.10 | — | — |
| 21 | 22.780 | 3.60 | 1.58913 | 61.2 |
| 22 | 84.318 | 9.18 | — | — |
| 23 | 45.200 | 2.80 | 1.62041 | 60.3 |
| 24 | −60.500 | 0.10 | — | — |
| 25 | 19.823 | 1.20 | 1.83400 | 37.2 |
| 26 | 9.066 | 1.43 | — | — |
| 27 | 14.000 | 3.00 | 1.56384 | 60.7 |
| 28 | −123.305 | 9.68 | — | — |
| 29 | ∞ | 3.50 | 1.49782 | 66.8 |
| 30 | ∞ | — | — | — |

<Embodiment 2>

A lens configuration of the zoom lens system having a high zoom ratio according to the second embodiment is shown in FIG. 5. Numerical data regarding the second embodiment is shown in Table 2 below. Aberrations at a shortest focal length extremity, an intermediate focal length, and a longest focal length extremity are shown in FIGS. 6A through 6D, 7A through 7D and 8A through 8D, respectively.

TABLE 2

$F_{NO} = 1:1.2–1.2–1.8$
$f = 6.18–30.00–87.49$
$ω = 26.7–5.5–1.9$
$f_B = d_{28} + d_{30} = 12.10$

| surface No. | r | d | N | υ |
|---|---|---|---|---|
| 1 | 111.400 | 2.00 | 1.80518 | 25.4 |
| 2 | 47.000 | 11.40 | 1.62041 | 60.3 |
| 3 | −301.001 | 0.10 | — | — |
| 4 | 45.100 | 5.50 | 1.69680 | 55.5 |
| 5 | 151.470 | 0.96–30.40–39.03 | — | — |
| 6 | 77.480 | 1.30 | 1.80400 | 46.6 |
| 7 | 13.310 | 5.76 | — | — |
| 8 | −17.929 | 1.40 | 1.69680 | 55.5 |
| 9 | 17.929 | 3.20 | 1.84666 | 23.8 |
| 10 | −202.500 | 40.01–4.99–5.93 | — | — |
| 11 | −27.300 | 1.40 | 1.69680 | 55.5 |
| 12 | −258.520 | 4.77–10.34–0.77 | — | — |
| 13 | ∞ | 0.50 | 1.51633 | 64.1 |
| 14 | ∞ | 1.00 | — | — |
| diaphragm | ∞ | 2.80 | — | — |
| 15 | 64.700 | 5.90 | 1.72916 | 54.7 |

TABLE 2-continued $F_{NO} = 1:1.2-1.2-1.8$
$f = 6.18-30.00-87.49$
$\omega = 26.7-5.5-1.9$
$f_B = d_{28} + d_{20} = 12.10$

| surface No. | r | d | N | ν |
|---|---|---|---|---|
| 16 | −27.060 | 0.14 | — | — |
| 17 | 39.866 | 3.80 | 1.58913 | 61.2 |
| 18 | −70.160 | 2.20 | — | — |
| 19 | −23.000 | 1.30 | 1.84666 | 23.8 |
| 20 | −138.296 | 0.10 | — | — |
| 21 | 22.800 | 3.90 | 1.58913 | 61.2 |
| 22 | 121.492 | 10.44 | — | — |
| 23 | ∞ | 2.50 | 1.51633 | 64.1 |
| 24 | −30.398 | 0.10 | — | — |
| 25 | 19.175 | 1.20 | 1.83400 | 37.2 |
| 26 | 8.600 | 1.00 | — | — |
| 27 | 13.120 | 3.20 | 1.56384 | 60.7 |
| 28 | −59.633 | 8.60 | — | — |
| 29 | ∞ | 3.50 | 1.49782 | 66.8 |
| 30 | ∞ | — | — | — |

<Embodiment 3>

A lens configuration of the zoom lens system having a high zoom ratio according to the third embodiment is shown in FIG. 9. Numerical data regarding the third embodiment is shown in Table 3 below. Aberrations at a shortest focal length extremity, an intermediate focal length, and a longest focal length extremity are shown in FIGS. 10A through 10D, 11A through 11D and 12A through 12D, respectively.

TABLE 3

$F_{NO} = 1:1.2-1.2-1.8$
$f = 6.18-30.00-87.50$
$\omega = 26.8-5.5-1.9$
$f_B = d_{28} + d_{20} = 11.86$

| surface No. | r | d | N | ν |
|---|---|---|---|---|
| 1 | 109.125 | 2.00 | 1.80518 | 25.4 |
| 2 | 46.966 | 10.80 | 1.62041 | 60.3 |
| 3 | −400.000 | 0.10 | — | — |
| 4 | 45.570 | 5.80 | 1.72916 | 54.7 |
| 5 | 152.064 | 0.96–30.27–38.87 | — | — |
| 6 | 77.586 | 1.30 | 1.80400 | 46.6 |
| 7 | 13.250 | 5.70 | — | — |
| 8 | −17.750 | 1.40 | 1.69680 | 55.5 |
| 9 | 17.750 | 3.20 | 1.84666 | 23.8 |
| 10 | −218.700 | 40.07–5.07–5.84 | — | — |
| 11 | −27.170 | 1.40 | 1.69680 | 55.5 |
| 12 | −249.207 | 4.45–10.13–0.77 | — | — |
| 13 | ∞ | 0.50 | 1.51633 | 64.1 |
| 14 | ∞ | 1.00 | — | — |
| diaphragm | ∞ | 2.80 | — | — |
| 15 | 69.476 | 5.90 | 1.72916 | 54.7 |
| 16 | −26.478 | 0.14 | — | — |
| 17 | 38.900 | 3.90 | 1.58913 | 61.2 |
| 18 | −71.301 | 2.05 | — | — |
| 19 | −23.370 | 1.30 | 1.84666 | 23.8 |
| 20 | −139.000 | 0.10 | — | — |
| 21 | 24.913 | 3.90 | 1.58913 | 61.2 |
| 22 | 170.400 | 11.27 | — | — |
| 23 | ∞ | 2.50 | 1.51633 | 64.1 |
| 24 | −28.852 | 0.10 | — | — |
| 25 | 19.080 | 1.20 | 1.83400 | 37.2 |
| 26 | 8.600 | 0.95 | — | — |
| 27 | 13.000 | 3.30 | 1.56384 | 60.7 |
| 28 | −62.490 | 8.36 | — | — |
| 29 | ∞ | 3.50 | 1.49782 | 66.8 |
| 30 | ∞ | — | — | — |

Numerical values of the relationships (1) through (11) corresponding to the three embodiments are shown in Table 4 below.

TABLE 4

| | Embodiment 1 | Embodiment 2 | Embodiment 3 |
|---|---|---|---|
| Relationship(1) | 7.00 | 6.47 | 6.48 |
| Relationship(2) | 0.29 | 0.30 | 0.30 |
| Relationship(3) | 0.79 | 0.79 | 0.80 |
| Relationship(4) | 0.66 | 0.76 | 0.75 |
| Relationship(5) | 1.02 | 1.08 | 1.09 |
| Relationship(6) | −0.59 | −0.59 | −0.59 |
| Relationship(7) | 0.39 | 0.41 | 0.40 |
| Relationship(8) | 0.44 | 0.37 | 0.43 |
| Relationship(9) | 1.08 | 0.88 | 0.89 |
| Relationship(10) | −2.16 | −2.64 | −2.50 |
| Relationship(11) | 1.49 | 1.67 | 1.82 |

As can be seen from Table 4 above, the first through third embodiments satisfy the requirements specified in relationships (1) through (11). It can also be seen from the corresponding figures that the aberrations are appropriately corrected.

As can be understood from the above discussion, according to the present invention, a compact, highly efficient zoom lens system having a high zoom ratio of approximately 15 and a large aperture, the F-number of which is approximately 1.2, is provided.

What is claimed is:

1. A zoom lens system, comprising:

a first lens group having a positive power;

a second lens group having a negative power and a magnification varying function, said second lens group being moved during a zooming operation;

a third lens group having a negative power and a focus compensating function, said third lens group being moved during said zooming operation; and a fourth lens group having a positive power and an image forming function, said fourth lens group not being moved during said zooming operation, wherein said first, second, third, and fourth lens groups are arranged in this order from an object side, said fourth lens group comprising, in order from said object side, a first sub-lens group and a second sub-lens group spaced from said first sub-lens group, each having a positive power, wherein said zoom lens system satisfies the following relationships:

$$5.5 < L_{W2-3}/f_W < 8.5,$$

$$0.2 < \text{lm}_{2W} < 0.4 \ (m_{2W} < 0),$$

$$0.6 < \text{lm}_4 < 0.9 \ (m_4 < 0),$$

$$0.5 < m_{4b} < 0.9, \text{ and}$$

wherein $L_{W2-3}$ represents a distance between said second lens group and said third lens group at a shortest focal length extremity, $f_W$ represents a focal length of the entire zoom lens system at said shortest focal length extremity, $m_{2W}$ represents a lateral magnification of said second lens group at said shortest focal length extremity, $m_4$ represents a lateral magnification of said fourth lens group, and $m_{4b}$ represents a lateral magnification of said second sub-lens group of said fourth lens group, wherein said first sub-lens group of said fourth lens group comprises, in order from said object side, a positive first lens element, a positive second lens element, a negative third lens element and a positive fourth lens element and satisfies the following relationships:

$$0.8 < f_4/f_{4a} < 1.3$$

$$-0.7 < f_{4d}/f_{4a-3} < -0.4,$$

$$0.2 < f_{4d}/f_{4a-4} < 0.7, \text{ and}$$

wherein $f_4$ represents a focal length of said fourth lens group, $f_{4a}$ represents a focal length of said first sub-lens group of said fourth lens group, $f_{4a-3}$ represents a focal length of said negative third lens element of said first sub-lens group of said fourth lens group, and $f_{4a-4}$ represents a focal length of said positive fourth lens element of said first sub-lens group of said fourth lens group.

2. The zoom lens system according to claim 1, further comprising a diaphragm provided between said third lens group and said fourth lens group so as not to move during said zooming operation.

3. A zoom lens system, comprising:

a first lens group having a positive power;

a second lens group having a negative power and a magnification varying function, said second lens group being moved during a zooming operation;

a third lens group having a negative power and a focus compensating function, said third lens group being moved during said zooming operation; and a fourth lens group having a positive power and an image forming function, said fourth lens group not being moved during said zooming operation, wherein said first, second, third, and fourth lens groups are arranged in this order from an object side, said fourth lens group comprising, in order from said object side, a first sub-lens group and a second sub-lens group spaced from said first sub-lens group, each having a positive power, wherein said zoom lens system satisfies the following relationships:

$$5.5 < L_{w2-3}/f_w < 8.5,$$

$$0.2 < |m_{2w}| < 0.4 (m_{2w} < 0),$$

$$0.6 < |m_4| < 0.9 (m_4 < 0),$$

$$0.5 < m_{4b} < 0.9, \text{ and}$$

wherein $L_{w2-3}$ represents a distance between said second lens group and said third lens group at a shortest focal length extremity, $f_w$ represents a focal length of the entire zoom lens system at said shortest focal length extremity, $m_{2w}$ represents a lateral magnification of said second lens group at said shortest focal length extremity, $m_4$ represents a lateral magnification of said fourth lens group, and $m_{4b}$ represents a lateral magnification of said second sub-lens group of said fourth lens group, wherein said second sub-lens group of said fourth lens group comprises, in order from said object side, a positive first lens element, a negative second lens element and a positive third lens element and satisfies the following relationships:

$$0.2 < f_{4a}/f_{4b} < 0.6,$$

$$0.7 < f_{4b}/f_{4b-1} < 1.2,$$

$$-3.0 < f_{4b}/f_{4b-2} < -2.0,$$

$$1.0 < L_{4ab}/f_w < 2.3, \text{ and}$$

wherein $f_{4a}$ represents a focal length of said first sub-lens group of said fourth lens group, $f_{4b}$ represents a focal length of said second sub-lens group of said fourth lens group, $f_{4b-1}$ represents a focal length of said positive first lens element of said second sub-lens group of said fourth lens group, $f_{4b-2}$ represents a focal length of said negative second lens element of said second sub-lens group of said fourth lens group, and $L_{4ab}$ represents a distance between said first sub-lens group and said second sub-lens group of said fourth lens group.

4. A The zoom lens system according to claim 3, further comprising a diaphragm provided between said third lens group and said fourth lens group so as not to move during said zooming operation.

* * * * *